(12) United States Patent
Dan et al.

(10) Patent No.: US 11,329,866 B2
(45) Date of Patent: *May 10, 2022

(54) BATTERY MANAGEMENT SYSTEM AND COMMUNICATION METHOD THEREOF (71) Applicant: Contemporary Amperex Technology Co., Limited, Ningde (CN)

(72) Inventors: Zhimin Dan, Ningde (CN); Wenbin Lu, Ningde (CN); Wei Zhang, Ningde (CN); Yizhen Hou, Ningde (CN); Jia Xu, Ningde (CN); Jiechao Luo, Ningde (CN); Teng Yu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,109

(22) Filed: Jan. 22, 2021

(65) Prior Publication Data

US 2021/0144052 A1 May 13, 2021

Related U.S. Application Data

(63) Continuation of application No. 16/540,402, filed on Aug. 14, 2019, now Pat. No. 10,938,628.

(30) Foreign Application Priority Data

Sep. 12, 2018 (CN) .......................... 201811061387.6

(51) Int. Cl.
*H04L 12/24* (2006.01)
*H04L 41/0668* (2022.01)
*H04B 1/713* (2011.01)

(52) U.S. Cl.
CPC .......... *H04L 41/0668* (2013.01); *H04B 1/713* (2013.01)

(58) Field of Classification Search
CPC ........................... H04L 41/0668; H04B 1/713
USPC ....................................................... 370/216
See application file for complete search history.

(56) References Cited

U.S. PATENT DOCUMENTS

2016/0268642 A1* 9/2016 Yamazoe ............ H01M 10/482
2017/0126036 A1* 5/2017 Dulle .................... G06F 1/3212
2017/0351561 A1* 12/2017 Yamazoe ................ H04Q 9/00
(Continued)

*Primary Examiner* — Faisal Choudhury
(74) *Attorney, Agent, or Firm* — Law Offices of Liaoteng Wang (57) ABSTRACT

The present disclosure provides a battery management system and a communication method. The method includes: determining, by a main BMU, from a plurality of managed units a fault unit that communicates abnormally with the main BMU, and transmitting, by the main BMU, to a backup BMU a fault frequency at which the fault unit communicates abnormally with the main BMU; selecting, by the backup BMU, from the managed units a managed unit that communicates normally with the backup BMU and the fault unit as a target unit; transmitting, by the backup BMU, frequency-conversion information to the fault unit through the target unit based on the fault frequency; converting, by the fault unit, its frequency to a frequency; transmitting the frequency to the main BMU if the backup BMU communicates normally with the fault unit using the frequency; and communicating, by the main BMU, with the fault unit using the frequency.

14 Claims, 4 Drawing Sheets (56) References Cited

U.S. PATENT DOCUMENTS

2018/0123705 A1* 5/2018 Henry ................. H04L 41/0695
2020/0015091 A1* 1/2020 Taskin ................. H04W 16/14

* cited by examiner

BATTERY MANAGEMENT SYSTEM AND COMMUNICATION METHOD THEREOF

CROSS-REFERENCE TO RELATED APPLICATION

This application is a continuation application of U.S. patent application Ser. No. 16/540,402, filed on Aug. 14, 2019, which claims priority to Chinese Patent Application No. 201811061387.6, filed on Sep. 12, 2018, the content of which are incorporated herein by reference in their entirety.

FIELD

The present disclosure relates to the technical field of batteries, and in particular, to a battery management system and a communication method thereof.

BACKGROUND

An existing battery management system (BMS) includes a battery management unit (BMU) and a plurality of managed units. The managed units include various devices such as a cell measurement circuit (CMC), a current sensor, a pressure sensor, a humidity sensor, a smoke sensor, etc.

As a core control unit of the BMS, the BMU is responsible for data interaction with each managed unit, and can complete tasks such as a command request, data upload, etc. The BMU needs to perform physical serial number encoding before communicating with the managed units normally. After the BMU completes the encoding, the managed units collect data such as voltage, temperature, current, diagnosis, etc., and report the data to the BMU periodically or based on an event through a wireless signal for the BMU to perform data processing and perform corresponding actions.

However, due to various factors such as a structural layout of the battery management system, an interference signal, multipath fading, etc., various issues of abnormal communication such as poor communication or communication interruption between the BMU and a certain managed unit may occur, thereby reducing the reliability of communication in the battery management system.

SUMMARY

According to embodiments of the present disclosure, there is provided a battery management system and a communication method thereof.

According to an aspect of the embodiments of the present disclosure, there is provided a communication method for use in a battery management system including a main battery management unit (BMU), a backup BMU and a plurality of managed units. The method may include: determining, by the main BMU, from the plurality of managed units a first fault unit that communicates abnormally with the main BMU, and transmitting, by the main BMU, to the backup BMU a fault frequency at which the first fault unit communicates abnormally with the main BMU; selecting, by the backup BMU, from the plurality of managed units a managed unit that communicates normally with both the backup BMU and the first fault unit as a first target unit; transmitting, by the backup BMU, first frequency conversion information to the first fault unit through the first target unit based on the fault frequency, wherein the first frequency conversion information is to instruct the first fault unit to convert its frequency to a first frequency; converting, by the first fault unit, its frequency to the first frequency based on the first frequency conversion information; transmitting, by the backup BMU, the first frequency to the main BMU if the backup BMU communicates normally with the first fault unit using the first frequency; and communicating, by the main BMU, with the first fault unit using the first frequency.

According to another aspect of the embodiments of the present disclosure, there is provided a battery management system. The battery management system may include: a main battery management unit (BMU) configured to determine from a plurality of managed units a fault unit that communicates abnormally with the main BMU, transmit to a backup BMU a fault frequency at which the fault unit communicates abnormally with the main BMU, and communicate with the fault unit using a first frequency; and the backup BMU configured to: select, from the plurality of managed units, a managed unit that communicates normally with both the backup BMU and the fault unit as a target unit; transmit frequency conversion information to the fault unit through the target unit based on the fault frequency, wherein the frequency conversion information is to instruct the fault unit to convert its frequency to the first frequency so as to cause the fault unit to convert its frequency to the first frequency based on the frequency conversion information; and transmit the first frequency to the main BMU if the backup BMU communicates normally with the fault unit using the first frequency.

BRIEF DESCRIPTION OF THE DRAWINGS

In order to illustrate technical solutions of the embodiments of the present disclosure more clearly, drawings that need to be used in the embodiments of the present disclosure will be briefly introduced below. For those ordinary skilled in the art, other drawings can be obtained from these drawings without any creative work.

DETAILED DESCRIPTION

The features and exemplary embodiments of the various aspects of the present disclosure will be described in detail below. In order to make objects, technical solutions and advantages of the present disclosure more comprehensible, the present disclosure will be further described in detail below with reference to the drawings and embodiments. It should be understood that the specific embodiments described herein are intended to be illustrative only and not to limit the present disclosure. For those skilled in the art, the present disclosure may be practiced without some of these specific details. The following description of embodiments is only provided, by illustrating examples of the present disclosure, for a better understanding of the present disclosure.

It should be noted that, in the present disclosure, relational terms such as first, second, etc. are merely used to distinguish one entity or operation from another entity or operation, and do not necessarily require or imply there is any such actual relationship or order among these entities or operations. Furthermore, terms such as "comprising", "including" or any other variations thereof are intended to encompass a non-exclusive inclusion, such that a process, method, article, or device that comprises a plurality of elements may include not only these elements but also other elements that are not listed explicitly, or may further include elements that are inherent to such a process, method, article, or device. An element defined by a phrase "comprising . . . " does not exclude the presence of an additional same element in the process, method, article, or device that comprises the element, without further limitation.

Figure 1:
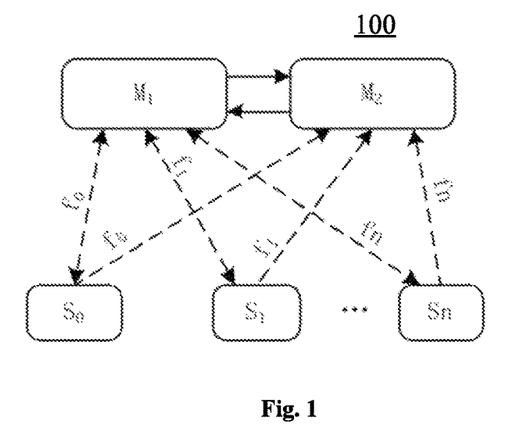
FIG. 1 illustrates a schematic structural diagram of a battery management system according to an embodiment of the present disclosure.

FIG. 1 illustrates a schematic structural diagram of a battery management system 100 according to an exemplary embodiment of embodiments of the present disclosure. Referring to FIG. 1, the battery management system may include a main battery management unit $M_1$, a backup battery management unit $M_2$, and a plurality of managed units $S_0, S_1, S_2 \ldots S_n$, wherein n is a positive integer greater than or equal to 0.

The main battery management unit $M_1$ may be configured to determine from the plurality of managed units a fault unit that communicates abnormally with $M_1$, transmit to $M_2$ a fault frequency at which the fault unit communicates abnormally with $M_1$, and communicate with the fault unit using a first frequency.

The backup battery management unit $M_2$ may be configured to: select, from the plurality of managed units, a managed unit that may communicate normally with both $M_2$ and the fault unit as a target unit; transmit frequency conversion information to the fault unit through the target unit based on the fault frequency, wherein the frequency conversion information is to instruct the fault unit to convert its frequency to the first frequency so as to cause the fault unit to convert its frequency to the first frequency based on the frequency conversion information; and transmit the first frequency to $M_1$ if $M_2$ may communicate normally with the fault unit using the first frequency.

The first frequency may be a frequency in a frequency table of the fault unit other than the fault frequency. A frequency table of a managed unit may include a plurality of frequencies at which the managed unit node can communicate.

A dotted line with an arrow(s) in FIG. 1 may represent that, $M_1$ and $M_2$ may wirelessly communicate with each managed unit respectively. Arrows between $M_1$ and $M_2$ may represent that they can communicate by wire or wirelessly.

$M_1$ may perform time-division communication with a managed unit $S_i$ through a frequency $f_i$. $M_2$ can also perform time-division communication with the managed unit $S_i$ through the frequency $f_i$, wherein i=0, 1 . . . n. There is no limit on a relationship among the n+1 frequencies of $f_0$, $f_1$, $f_2 \ldots f_n$, and they may be equal or unequal.

In an embodiment of the present disclosure, $M_1$, $M_2$ and each managed unit all may have a storage space for storing latest communication frequencies of all managed units in the battery management system, to achieve communication between any two managed units.

Figure 2:
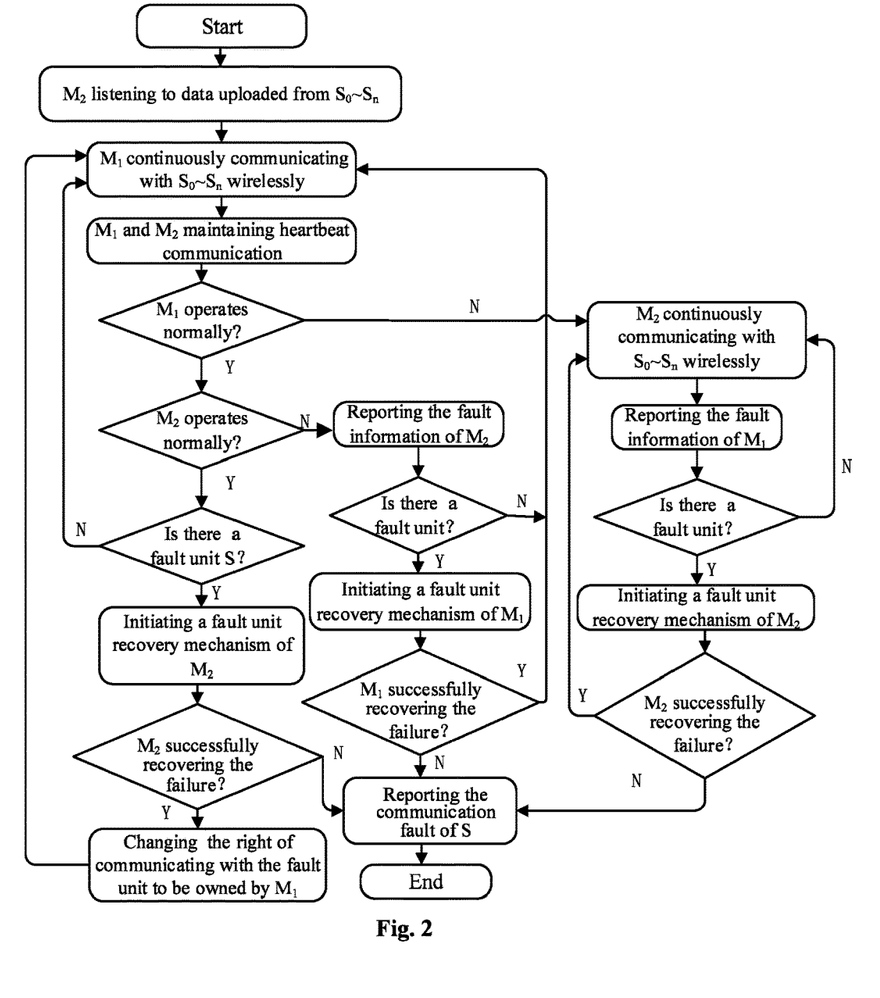
FIG. 2 illustrates a schematic flow chart of an exemplary communication method for use in the battery management system of FIG. 1 according to some embodiments of the present disclosure.

FIG. 2 illustrates a schematic flow chart of a communication method for use in the battery management system of FIG. 1. Referring to FIG. 2, in an initial stage, $M_1$, $M_2$ and the plurality of managed units $S_0$, $S_1$, $S_2$ . . . $S_n$ all may operate normally, at this time $M_2$ may only listen to data uploaded from the managed units $S_0$, $S_1$, $S_2$ . . . $S_n$, and not issue control instructions to the managed units $S_0$, $S_1$, $S_2$ . . . $S_n$. Moreover, each managed unit may continuously communicate with $M_1$ wirelessly, and the communication between each managed unit and $M_1$ may be independent.

$M_1$ and $M_2$ may maintain heartbeat communication, and $M_2$ may be in an approximately sleep state. $M_1$ may update communication parameters of each managed unit in the battery management system to $M_2$ in real time.

In an embodiment of the present disclosure, $M_2$ may determine whether $M_1$ operates normally, namely whether $M_1$ has failed, by determining whether a heartbeat message transmitted by $M_1$ can be received within a preset period. If $M_2$ can receive the heartbeat message transmitted by $M_1$ within the preset period, then it may be determined that $M_1$ operates normally. Otherwise, it may be determined that $M_1$ operates abnormally.

If $M_1$ operates normally, $M_1$ may determine whether $M_2$ operates normally, namely whether $M_2$ has failed, by determining whether a heartbeat message transmitted by $M_2$ can be received within a preset period. If $M_1$ can receive the heartbeat message transmitted by $M_2$ within the preset period, then it may be determined that $M_2$ operates normally. Otherwise, it may be determined that $M_2$ operates abnormally.

In an embodiment of the present disclosure, if both $M_1$ and $M_2$ operate normally, then $M_1$ may determine whether there is a fault unit that communicates abnormally with $M_1$ among the plurality of managed units. As an example, if $M_1$ communicates with $S_0$ at a frequency $f_0$, but $M_1$ fails to receive feedback information from $S_0$ within a preset period, then $M_1$ may determine that communication with $S_0$ is abnormal, that is, $M_1$ may determine that $S_0$ is a fault unit.

In an embodiment of the present disclosure, if $M_1$ determines that there is no fault unit among the plurality of managed units, then each of the managed units $S_0$, $S_1$, $S_2$ . . . $S_n$ may continuously communicate with $M_1$ wirelessly.

If $M_1$ determines that there is a fault unit S among the plurality of managed units, then $M_1$ may inform $M_2$, by wire or wirelessly, to initiate a fault unit recovery mechanism of $M_2$. Then $M_2$ may no longer listen to the data uploaded by each managed unit $S_0$, $S_1$, $S_2$ . . . $S_n$. At the same time, $M_1$ may continue to perform normal data interaction with the remaining normal managed units.

Figure 3:
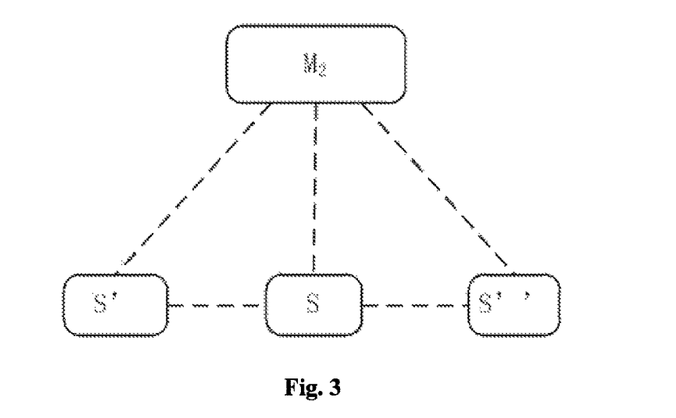
FIG. 3 illustrates a schematic diagram of an exemplary architecture of a backup battery management unit and managed units according to some embodiments of the present disclosure.

FIG. 3 illustrates a schematic architecture diagram of a backup battery management unit and managed units according to an embodiment of the present disclosure. Referring to FIG. 3, S' may be any managed unit in $S_0, S_1, S_2 \ldots S_n$ other than the fault unit S. S" may be a set of all managed units in $S_0, S_1, S_2 \ldots S_n$ except S' and S. Dotted lines in FIG. 3 may represent wireless connections.

Figure 4:
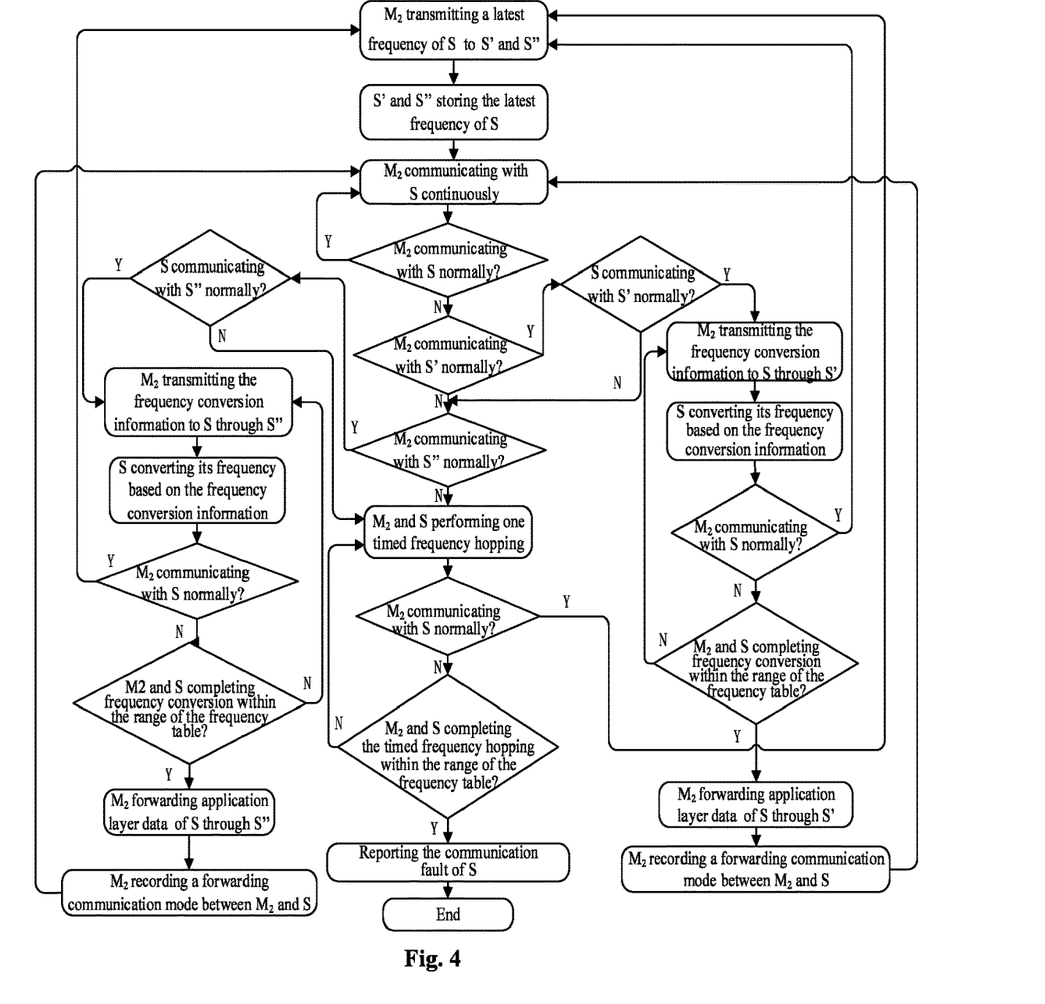
FIG. 4 illustrates a schematic flow chart of a fault unit recovery mechanism of a backup battery management unit according to some embodiments of the present disclosure.

FIG. 4 illustrates a schematic flow chart of a fault unit recovery mechanism of $M_2$. Referring to FIG. 4, when $M_2$ communicates abnormally with S, $M_2$ may select one managed unit S' from the plurality of managed units. $M_2$ may determine whether communication with S' is normal. If $M_2$ can communicate with S' normally, then $M_2$ may continue to determine whether communication between S' and S is normal. If S' can also communicate with S normally, then S' may be determined as a target unit. The target unit may be a managed unit that may communicate with $M_2$ normally and may communicate with S normally.

It should be noted that, since S' cannot communicate with two battery management units at the same time, $M_2$ will communicate with $M_1$ first before communicating with S'. $M_1$ will give up the right to use S', so that $M_2$ can communicate with S' using a communication frequency of S'. The coordination of the right to use managed units may be achieved through a network N between $M_1$ and $M_2$.

S' may communicate with S using the fault frequency of S. Both a frequency of communication between $M_2$ and S' and a frequency of communication between S' and S may be transmitted by $M_1$ to $M_2$ via the network N.

Continuing to refer to FIG. 4, after $M_2$ selects the target unit S', $M_2$ may transmit the frequency conversion information to the target unit S'. It is worth mentioning that before $M_2$ transmits the frequency conversion information to the target unit S', $M_1$ may transmit the fault frequency of the fault unit to $M_2$, so that $M_2$ may set the frequency conversion information based on the fault frequency and a frequency table of the fault unit. The frequency conversion information may be information determined by the $M_2$ based on the frequency table of the fault unit and the fault frequency, and the frequency conversion information may instruct the fault unit to convert its frequency. A frequency included in the frequency conversion information may be a frequency in the frequency table of the fault unit other than the fault frequency.

$M_2$ may select, from the frequency table of S, any frequency other than the fault frequency as the frequency in the frequency conversion information that S needs to convert to, and then $M_2$ may transmit the frequency conversion information to S through the target unit S', so as to cause S to convert its communication frequency based on the frequency conversion information.

After the frequency of S is successfully converted based on the frequency conversion information, a feedback signal indicating successful conversion may be transmitted to $M_2$ through the target unit S'. $M_2$ may attempt to communicate with S using the frequency of S after the frequency conversion. If $M_2$ may successfully communicate with S using the frequency of S after the frequency conversion, then the frequency after the frequency conversion may be the first frequency described above, and $M_2$ may transmit the first frequency to $M_1$. $M_1$ may communicate with S normally using the received first frequency. That is to say, the right of communicating with S may be changed to be owned by $M_1$. At the same time, $M_2$ may transmit the first frequency to S' and S". S' and S" may store the latest communication frequency of S, namely the first frequency, to achieve communication between any two managed units.

If $M_2$ fails to communicate with S using the frequency of S after the frequency conversion, then $M_2$ may determine whether the frequency conversion of S is completed within a range of the frequency table of S. That is to say, $M_2$ may determine whether there is still a frequency that is not selected for setting the frequency conversion information in the frequency table of S. If so, $M_2$ may reset the frequency conversion information with the unselected frequency, and may transmit the updated frequency conversion information to S through the target unit S'.

If $M_2$ has selected each frequency in the frequency table except the fault frequency for setting the frequency conversion information, then it may mean that each frequency in the frequency table of S cannot be used by $M_2$ to communicate with S, then application layer data between $M_2$ and S may be forwarded using the target unit S'. $M_2$ may record a forwarding communication mode between $M_2$ and S.

Since $M_1$ and $M_2$ can achieve data transmission between them through the network N, the data between $M_1$ and S may be forwarded through $M_2$ and S' to achieve indirect communication between $M_1$ and S, thereby further improving the reliability of communication in the battery management system.

In an embodiment of the present disclosure, if communication between $M_2$ and S' is abnormal, then $M_2$ may determine whether there is a target unit in S" that may communicate normally with both $M_2$ and S. If there is a target unit in S", then $M_2$ may change the frequency of S through the target unit in S" to achieve recovery of communication between $M_1$ and S. Similarly, if $M_2$ and S still fail to communicate with each other after performing frequency conversion of S within the range of the frequency table of S through the target unit in S", then indirect communication between $M_1$ and S may be achieved using the target unit in S" and $M_2$.

In an embodiment of the present disclosure, if communication between $M_2$ and S' is abnormal, and communication between $M_2$ and any of the managed units in S" is abnormal, then it may mean that $M_2$ fails to select a target unit among the plurality of managed units, then $M_2$ will enter a timed frequency hopping based on a preset frequency table of S and a preset hopping rule.

Since polling all managed units by $M_2$ may need a certain amount of time, in order to avoid a time delay between S and $M_2$ in entering the timed frequency hopping, S may enter the timed frequency hopping after a preset time period. A value of the preset time period may be set to a time period required to complete polling all managed units by $M_2$ and to determine that the target unit does not exist, so as to ensure that a frequency of S after the timed frequency hopping is consistent with a frequency of $M_2$ after the timed frequency hopping.

In an embodiment of the present disclosure, after one timed frequency hopping of $M_2$ and S, $M_2$ and S may attempt to communicate with each other based on the frequency after the frequency hopping. If communication between $M_2$ and S is successful, then $M_2$ may transmit the frequency after the frequency hopping to $M_1$. $M_1$ may communicate with S using the frequency after the frequency hopping. Moreover, $M_2$ may transmit the frequency after the frequency hopping to S' and S". S' and S" may store the frequency of S after the frequency hopping.

If communication between $M_2$ and S fails, then $M_2$ may determine whether the timed frequency hopping is completed within the range of the frequency table of S, that is to say, $M_2$ may determine whether there is a frequency that may cause communication between $M_2$ and S to be successful within the range of the frequency table of S.

If $M_2$ determines that after the timed frequency hopping is completed within the range of the frequency table of S, communication between $M_2$ and S still fails, then $M_2$ may report communication fault information of S to a background monitoring system.

In the battery management system according to an embodiment of the present disclosure, before reporting a communication failure of the fault unit, a selected target unit may be used by the backup battery management unit to change the frequency of the fault unit, or data between the main battery management unit and the fault unit may be forwarded through the backup battery management unit and the target unit, or the timed frequency hopping may be performed by the backup battery management unit and the fault unit, so as to automatically recover normal communication between the main battery management unit and the fault unit, thereby avoiding abnormal communication caused by factors such as external interference, a structural layout of nodes, etc., which improves the reliability of wireless communication.

Moreover, if the managed units have a high requirement with respect to a data update rate, $M_1$ may achieve synchronization of normal data transmission and reception and a fault unit recovery task through communication between $M_1$ and $M_2$, thereby increasing a data processing speed of $M_1$, while improving the reliability of communication in the battery management system.

In an embodiment of the present disclosure, if $M_1$ determines that there is a fault unit S among the plurality of managed units, and communication between $M_2$ and S is normal, then $M_1$ may also use $M_2$ as a repeater to change the frequency of S, thereby recovering communication between $M_1$ and S.

Specifically, $M_1$ may transmit the frequency conversion information to $M_2$ through the network N, and $M_2$ may transmit the frequency conversion information to S. $M_2$ may communicate with S at the fault frequency of S. S may convert its frequency based on the frequency conversion information.

$M_1$ may attempt to communicate with S using the converted frequency of S. If communication between $M_1$ and S is normal, then each managed unit $S_0, S_1, S_2 \ldots S_n$ may continuously communicate with $M_1$ wirelessly. If communication between $M_1$ and S is abnormal, then $M_1$ may re-update the frequency conversion information based on the frequency table of S until $M_1$ can communicate with the fault unit S successfully using a certain frequency in the frequency table of S.

If $M_1$ fails to communicate with S successfully using any frequency in the frequency table of S fails, then $M_2$ can be used to forward the data between $M_1$ and S to improve the reliability of the battery management system.

In an embodiment of the present disclosure, if $M_1$ operates abnormally and $M_2$ operates normally, then $M_2$ may take over tasks of $M_1$, maintain communication with the managed units $S_0, S_1, S_2 \ldots S_n$, and report the fault information of $M_1$. $M_2$ may determine whether there is a fault unit in $S_0, S_1, S_2 \ldots S_n$.

If not, $M_2$ may maintain communication with $S_0, S_1, S_2 \ldots S_n$. If $M_2$ determines that there is a fault unit in $S_0, S_1, S_2 \ldots S_n$, then the fault unit recovery mechanism of the backup battery management unit $M_2$ may be initiated. The fault unit recovery mechanism of $M_2$ may be known with reference to FIG. 4, and details thereof will not be described herein again.

If $M_2$ successfully recovers the failure, $M_2$ may continue the communication with $S_0, S_1, S_2 \ldots S_n$. If $M_2$ fails to recover the failure, the communication failure of the fault unit may be reported to the background monitoring system.

In the battery management system according to an embodiment of the present disclosure, when the main battery management unit operates abnormally, communication with the managed units may be achieved through the backup battery management unit, thereby improving the reliability of communication between the managed units and the battery management unit. Moreover, the backup battery management unit may recover communication with the fault unit by itself, thereby further improving the reliability of communication in the battery management system and reducing the time for fault maintenance.

In an embodiment of the present disclosure, if $M_1$ operates normally and $M_2$ operates abnormally, then $M_1$ may report the fault information of $M_2$. $M_1$ may determine whether there is a fault unit in $S_0, S_1, S_2 \ldots S_n$. If not, $M_1$ may maintain communication with $S_0, S_1, S_2 \ldots S_n$. If $M_1$ determines that there is a fault unit in $S_0, S_1, S_2 \ldots S_n$, then a fault unit recovery mechanism of $M_1$ may be initiated.

The fault unit recovery mechanism of $M_1$ is similar to the fault unit recovery mechanism of $M_2$, which may be known with reference to FIG. 4, and details thereof will not be described herein again.

If $M_1$ successfully recovers the failure, $M_1$ may continue the communication with $S_0, S_1, S_2 \ldots S_n$. If $M_1$ fails to recover the failure, the communication failure of the fault unit may be reported to the background monitoring system.

In the battery management system according to an embodiment of the present disclosure, the main battery management unit may achieve not only data transmission and reception with normal managed units, but also communication recovery of the fault unit, thereby improving the reliability of the battery management system.

It should be noted that, in an embodiment of the present disclosure, the number of fault units may be one or more. The number of fault units is less than or equal to the number of managed units in the battery management system. When the number of fault units is more than one, the communication method for use in the battery management system according to an embodiment of the present disclosure may be used to select a target unit for each fault unit, so that the battery management unit can recover communication with the fault unit through the target unit, thereby improving the reliability of wireless communication in the battery management system.

Figure 5:
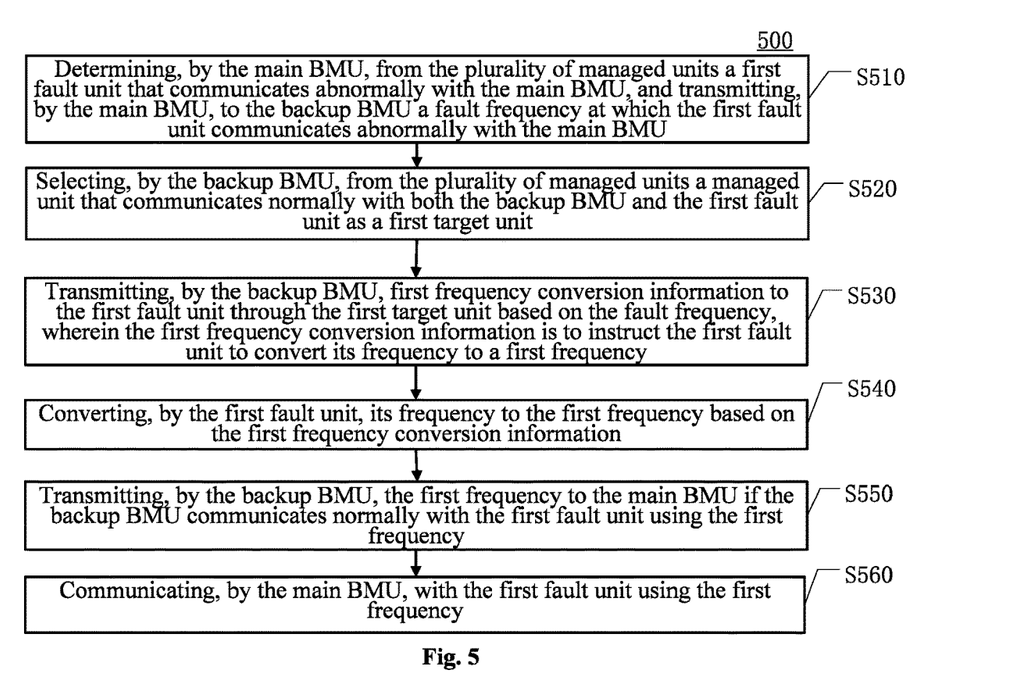
FIG. 5 illustrates a schematic flow chart of a communication method for use in a battery management system according to some embodiments of the present disclosure.

FIG. 5 illustrates a schematic flow chart of a communication method 500 for use in a battery management system according to some further embodiments of the present disclosure. As shown in FIG. 5, the communication method for use in the battery management system according to the embodiments of the present disclosure may include the following steps.

In step S510, the main BMU may determine, from the plurality of managed units, a first fault unit that communicates abnormally with the main BMU, and transmit to the backup BMU a fault frequency at which the first fault unit communicates abnormally with the main BMU.

In step S520, the backup BMU may select, from the plurality of managed units, a managed unit that may communicate normally with both the backup BMU and the first fault unit as a first target unit.

In step S530, the backup BMU may transmit the first frequency conversion information to the first fault unit through the first target unit based on the fault frequency, wherein the first frequency conversion information is to instruct the first fault unit to convert its frequency to a first frequency.

In step S540, the first fault unit may convert its frequency to the first frequency based on the first frequency conversion information.

In step S550, the backup BMU may transmit the first frequency to the main BMU if the backup BMU may communicate normally with the first fault unit using the first frequency.

In step S560, the main BMU may communicate with the first fault unit using the first frequency.

In the method for use in the battery management system according to an embodiment of the present disclosure, communication between the main BMU and the first fault unit may be recovered by using the backup BMU to change a frequency of the first fault unit that communicates abnormally with the main BMU, and by using the communication between the backup BMU and the main BMU, thereby improving the reliability of communication in the battery management system.

Moreover, in the case that the managed units require a higher data update rate, the main BMU may achieve data transmission and reception with normal managed units, and the frequency of the first fault unit may also be changed by controlling the backup BMU so as to recover communication between the main BMU and the first fault unit, thereby achieving synchronization of normal data transmission and reception and communication recovery of fault unit, which improves the processing speed of the main BMU and the reliability of communication at the same time.

In some embodiments of the present disclosure, the communication method for use in the battery management system may further include:

The backup BMU may transmit the first frequency to all managed units of the plurality of managed units except the first fault unit.

In some embodiments of the present disclosure, step S520 may include the following steps.

The backup BMU may select, from the plurality of managed units, any managed unit other than the first fault unit as a first managed unit.

The backup BMU may determine whether the first managed unit may communicate normally with the backup BMU and the first fault unit.

The backup BMU may determine the first managed unit as the first target unit, if the first managed unit may communicate normally with both the backup BMU and the first fault unit.

The backup BMU may reselect the first managed unit until the first target unit is selected from the plurality of managed units by the backup BMU, if the first managed unit communicates abnormally with at least one of the backup BMU and the first fault unit.

In an embodiment of the present disclosure, the backup BMU may select the first target unit by polling a set of managed units in the plurality of managed units except the first fault unit to check communication of managed units with the backup BMU and the first fault unit.

In some embodiments of the present disclosure, the communication method for use in the battery management system may further include the following steps.

The main BMU may forward data between the main BMU and the first fault unit through the backup BMU and the first target unit, if the backup BMU communicates abnormally with the first fault unit using the first frequency.

By using the backup BMU and the first target unit to forward the data between the main BMU and the first fault unit, indirect communication between the main BMU and the first fault unit may be achieved, thereby further improving the reliability of communication in the battery management system.

In some embodiments of the present disclosure, the communication method for use in the battery management system may further include the following steps.

Both the backup BMU and the first fault unit may perform a timed frequency hopping based on a preset first frequency hopping rule if the backup BMU fails to select the first target unit from the plurality of managed units, wherein a second frequency of the backup BMU after the timed frequency hopping is consistent with a frequency of the first fault unit after the timed frequency hopping based on the first frequency hopping rule.

The backup BMU may communicate with the first fault unit using the second frequency after the frequency hopping.

The backup BMU may transmit the second frequency after the frequency hopping to the main BMU if the backup BMU may communicate normally with the first fault unit using the second frequency after the frequency hopping.

The main BMU may communicate with the first fault unit using the second frequency after the frequency hopping.

The backup BMU may report fault information of the first fault unit if the backup BMU communicates abnormally with the first fault unit using the second frequency after the frequency hopping.

In an embodiment of the present disclosure, if the backup BMU fails to select the first target unit, then the backup BMU and the first fault unit may perform the timed frequency hopping to achieve successful communication between the main BMU and the first fault unit.

Figure 6:
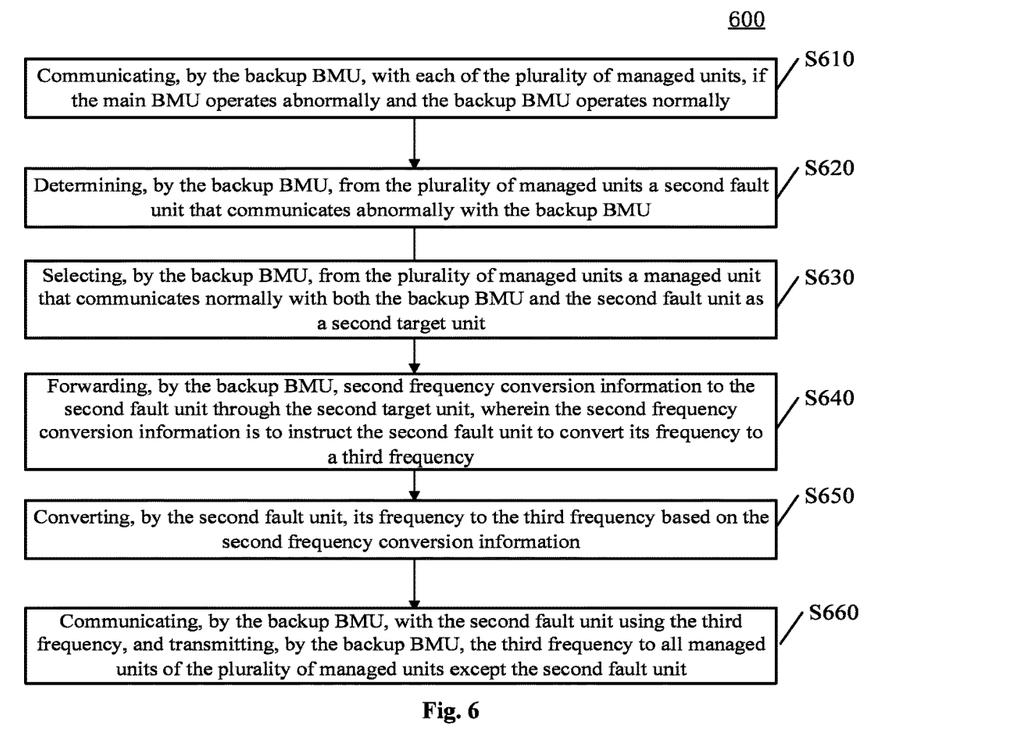
FIG. 6 illustrates a schematic flow chart of a communication method for use in a battery management system according to some further embodiments of the present disclosure.

FIG. 6 illustrates a schematic flow chart of a communication method 600 for use in a battery management system according to some further embodiments of the present disclosure. As shown in FIG. 6, the communication method for use in the battery management system may include the following steps.

In step S610, the backup BMU may communicate with each of the plurality of managed units, if the main BMU operates abnormally and the backup BMU operates normally.

In step S620, the backup BMU may determine, from the plurality of managed units, a second fault unit that communicates abnormally with the backup BMU.

In step S630, the backup BMU may select, from the plurality of managed units, a managed unit that may communicate normally with both the backup BMU and the second fault unit as a second target unit.

In step S640, the backup BMU may forward second frequency conversion information to the second fault unit through the second target unit, wherein the second frequency conversion information is to instruct the second fault unit to convert its frequency to a third frequency In step S650, the second fault unit may convert its frequency to the third frequency based on the second frequency conversion information.

In step S660, the backup BMU may communicate with the second fault unit using the third frequency, and transmit the third frequency to all managed units of the plurality of managed units except the second fault unit.

In an embodiment of the present disclosure, if the main BMU operates abnormally and the backup BMU operates normally, the backup BMU may take over tasks of the main BMU and achieve communication with the plurality of managed units, thereby improving the reliability of communication in the battery management system. If the backup BMU detects the second fault unit, the backup BMU may recover communication between the backup BMU and the second fault unit by changing the frequency of the second fault unit, thereby further improving the reliability of communication in the battery management system.

In some embodiments of the present disclosure, the communication method for use in the battery management system may further include the following steps.

The backup BMU may forward data between the backup BMU and the second fault unit through the second target unit, if the backup BMU communicates abnormally with the second fault unit using the third frequency.

In some embodiments of the present disclosure, the communication method for use in the battery management system may further include the following steps.

Both the backup BMU and the second fault unit may perform a timed frequency hopping based on a preset second frequency hopping rule if the backup BMU fails to select the second target unit from the plurality of managed units, wherein a fourth frequency of the backup BMU after the frequency hopping is consistent with a frequency of the second fault unit after the timed frequency hopping based on the second frequency hopping rule.

The backup BMU may communicate with the second fault unit using the fourth frequency after the frequency hopping.

The backup BMU may transmit the fourth frequency after the frequency hopping to all managed units of the plurality of managed units except the second fault unit if the backup BMU may communicate normally with the second fault unit using the fourth frequency after the frequency hopping. The backup BMU may report fault information of the second fault unit if the backup BMU communicates abnormally with the second fault unit using the fourth frequency after the frequency hopping.

With the communication method for use in the battery management system according to an embodiment of the present disclosure, before reporting the failure of the second fault unit, the data between the backup BMU and the second fault unit may further be forwarded by the backup BMU using the second target unit, or the backup BMU and the second fault unit may perform the timed frequency hopping, so as to recover communication between the backup BMU and the second fault unit, thereby further improving the reliability of communication in the battery management system.

Figure 7:
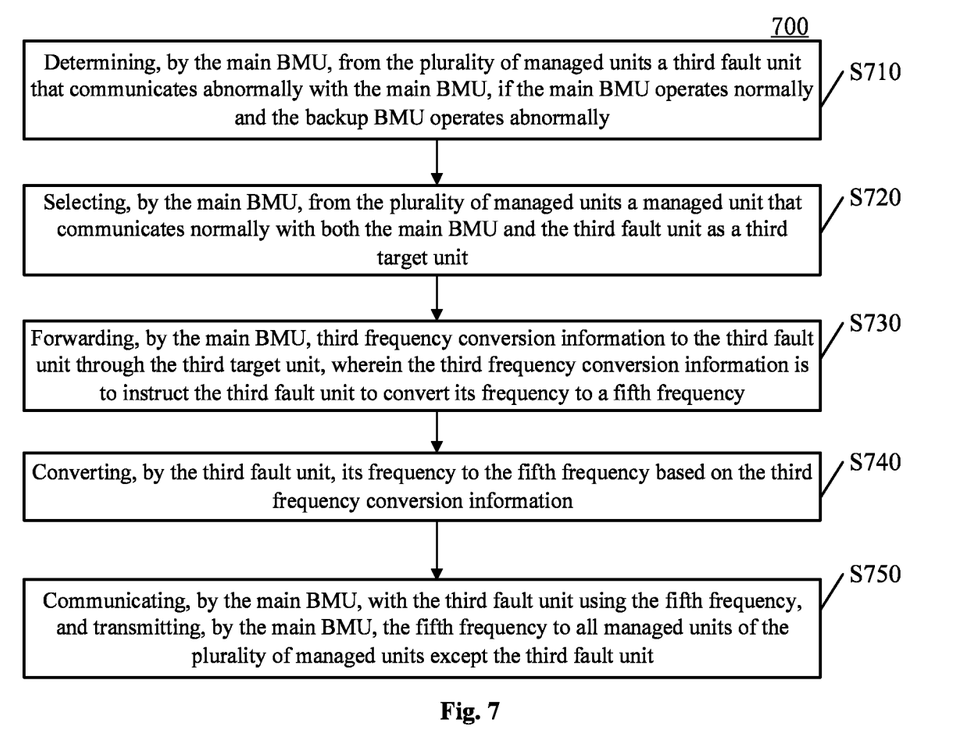
FIG. 7 illustrates a schematic flow chart of a communication method for use in a battery management system according to still further embodiments of the present disclosure.

FIG. 7 illustrates a schematic flow chart of a communication method 700 for use in a battery management system according to some further embodiments of the present disclosure. As shown in FIG. 7, the communication method for use in the battery management system may include the following steps.

In step S710, the main BMU may determine, from the plurality of managed units, a third fault unit that communicates abnormally with the main BMU, if the main BMU operates normally and the backup BMU operates abnormally.

In step S720, the main BMU may select, from the plurality of managed units, a managed unit that may communicate normally with both the main BMU and the third fault unit as a third target unit.

In step S730, the main BMU may forward third frequency conversion information to the third fault unit through the third target unit, wherein the third frequency conversion information is to instruct the third fault unit to convert its frequency to a fifth frequency.

In step S740, the third fault unit may convert its frequency to the fifth frequency based on the third frequency conversion information.

In S750, the main BMU may communicate with the third fault unit using the fifth frequency, and transmit the fifth frequency to all managed units of the plurality of managed units except the third fault unit.

In the communication method for use in the battery management system according to an embodiment of the present disclosure, the main BMU may change the frequency of the third fault unit through the selected third target unit, so as to achieve recovery of communication between the main BMU and the third fault unit, thereby improving the reliability of communication.

In some embodiments of the present disclosure, the communication method for use in the battery management system may further include the following steps.

The main BMU may forward data between the main BMU and the third fault unit through the third target unit, if the main BMU communicates abnormally with the third fault unit using the fifth third frequency.

In an embodiment of the present disclosure, the communication method for use in the battery management system may further include the following steps.

Both the main BMU and the third fault unit may perform a timed frequency hopping based on a preset third frequency hopping rule if the main BMU fails to select the third target unit from the plurality of managed units, wherein a sixth frequency of the main BMU after the frequency hopping is consistent with a frequency of the third fault unit after the timed frequency hopping based on the third frequency hopping rule.

The main BMU may communicate with the third fault unit using the sixth frequency after the frequency hopping.

The main BMU may transmit the sixth frequency after the frequency hopping to all managed units of the plurality of managed units except the third fault unit if the main BMU may communicate normally with the third fault unit using the sixth frequency after the frequency hopping.

The main BMU may report fault information of the third fault unit if the main BMU communicates abnormally with the third fault unit using the sixth frequency after the frequency hopping.

With the communication method for use in the battery management system according to an embodiment of the present disclosure, before reporting the failure of the third fault unit, the data between the main BMU and the third fault unit may further be forwarded by the main BMU using the third target unit, or the main BMU and the third fault unit may perform the timed frequency hopping, so as to recover communication between the main BMU and the third fault unit, thereby further improving the reliability of communication in the battery management system.

Other details of the communication method for use in the battery management system according to an embodiment of the present disclosure are similar to those of the battery management system according to an embodiment of the present disclosure described above with reference to FIGS. 1 to 4, which will not be described herein again.

It should also be noted that the exemplary embodiments mentioned in the present disclosure describe some methods or systems based on a series of steps or devices. However, the present disclosure is not limited to the order of the above steps, that is, the steps may be performed in the order mentioned in the embodiments, or may be performed in an order different from the order in the embodiments, or several steps may be performed simultaneously.

The description above only refers to specific implementations of the present disclosure, and those skilled in the art can clearly understand that for the convenience and brevity of the description, specific operating processes of systems, modules and units described above can refer to corresponding processes in the foregoing method embodiments, which will not be repeated here. It should be understood that the scope of the present disclosure is not limited thereto, and various equivalent modifications or substitutions may be easily conceived by those skilled in the art within the scope of the present disclosure. Those modifications or substitutions should be covered by the scope of the present disclosure.

What is claimed is:

1. A communication method performed by a main battery management unit (BMU), the method comprising:
   determining, by the main BMU, from a plurality of managed units a first fault unit that communicates abnormally with the main BMU;
   transmitting, by the main BMU, to a backup BMU a fault frequency at which the first fault unit communicates abnormally with the main BMU, wherein the fault frequency is used by the backup BMU to transmit first frequency conversion information to the first fault unit through a first target unit, wherein the first frequency conversion information is to instruct the first fault unit to convert its frequency to a first frequency, wherein the first target unit is a managed unit selected by the backup BMU from the plurality of managed units that communicates normally with both the backup BMU and the first fault unit; and
   communicating, by the main BMU, with the first fault unit using the first frequency received from the backup BMU, wherein the first frequency is transmitted to the main BMU by the backup BMU under a condition that the backup BMU communicates normally with the first fault unit using the first frequency.

2. The method of claim 1, wherein the method further comprises:
   forwarding, by the main BMU, data between the main BMU and the first fault unit through the backup BMU and the first target unit, under a condition that the backup BMU communicates abnormally with the first fault unit using the first frequency.

3. The method of claim 1, wherein the method further comprises:
   communicating, by the main BMU, with the first fault unit using a second frequency after a frequency hopping received from the backup BMU, wherein a timed frequency hopping is performed, by both the backup BMU and the first fault unit, based on a preset first frequency hopping rule under a condition that the backup BMU fails to select the first target unit from the plurality of managed units, wherein the second frequency of the backup BMU after the timed frequency hopping is consistent with a frequency of the first fault unit after the timed frequency hopping based on the first frequency hopping rule, wherein the second frequency after the frequency hopping is transmitted, by the backup BMU, to the main BMU under a condition that the backup BMU communicates normally with the first fault unit using the second frequency after the frequency hopping.

4. The method of claim 1, wherein the method further comprises:
   determining, by the main BMU, from the plurality of managed units a third fault unit that communicates abnormally with the main BMU, under a condition that the main BMU operates normally and the backup BMU operates abnormally;
   selecting, by the main BMU, from the plurality of managed units a managed unit that communicates normally with both the main BMU and the third fault unit as a third target unit;
   forwarding, by the main BMU, third frequency conversion information to the third fault unit through the third target unit, wherein the third frequency conversion information is to instruct the third fault unit to convert its frequency to a fifth frequency; and
   communicating, by the main BMU, with the third fault unit using the fifth frequency, and transmitting, by the main BMU, the fifth frequency to all managed units of the plurality of managed units except the third fault unit.

5. The method of claim 1, wherein the method further comprises:
   forwarding, by the main BMU, data between the main BMU and the third fault unit through the third target unit, under a condition that the main BMU communicates abnormally with the third fault unit using the fifth third frequency.

6. The method of claim 1, wherein the method further comprises:
   performing a timed frequency hopping, by both the main BMU and the third fault unit, based on a preset third frequency hopping rule if the main BMU fails to select the third target unit from the plurality of managed units, wherein a sixth frequency of the main BMU after the frequency hopping is consistent with a frequency of the third fault unit after the timed frequency hopping based on the third frequency hopping rule;
   communicating, by the main BMU, with the third fault unit using the sixth frequency after the frequency hopping;
   transmitting, by the main BMU, the sixth frequency after the frequency hopping to all managed units of the plurality of managed units except the third fault unit under a condition that the main BMU communicates normally with the third fault unit using the sixth frequency after the frequency hopping; and
   reporting, by the main BMU, fault information of the third fault unit under a condition that the main BMU communicates abnormally with the third fault unit using the sixth frequency after the frequency hopping.

7. A communication method performed by a backup battery management unit (BMU), the method comprising:
   receiving, by the backup BMU, a fault frequency at which a first fault unit communicates abnormally with a main BMU, wherein the first fault unit is determined by the main BMU from a plurality of managed units;
   selecting, by the backup BMU, from the plurality of managed units a managed unit that communicates normally with both the backup BMU and the first fault unit as a first target unit;
   transmitting, by the backup BMU, first frequency conversion information to the first fault unit through the first target unit based on the fault frequency, wherein the first frequency conversion information is to instruct the first fault unit to convert its frequency to a first frequency; and
   transmitting, by the backup BMU, the first frequency to the main BMU under a condition that the backup BMU communicates normally with the first fault unit using the first frequency, wherein the first frequency is used by the main BMU to communicate with the first fault unit.

8. The method of claim 7, wherein the method further comprises:
   transmitting, by the backup BMU, the first frequency to all managed units of the plurality of managed units except the first fault unit.

9. The method of claim 7, wherein selecting, by the backup BMU, from the plurality of managed units a managed unit that communicates normally with both the backup BMU and the first fault unit as a first target unit comprises:
  selecting, by the backup BMU, from the plurality of managed units any managed unit other than the first fault unit as a first managed unit;
  determining, by the backup BMU, whether the first managed unit communicates normally with the backup BMU and the first fault unit;
  determining, by the backup BMU, the first managed unit as the first target unit, under a condition that the first managed unit communicates normally with both the backup BMU and the first fault unit; and
  reselecting, by the backup BMU, the first managed unit until the first target unit is selected from the plurality of managed units by the backup BMU, under a condition that the first managed unit communicates abnormally with at least one of the backup BMU and the first fault unit.

10. The method of claim 7, wherein the method further comprises:
  performing a timed frequency hopping, by both the backup BMU and the first fault unit, based on a preset first frequency hopping rule under a condition that the backup BMU fails to select the first target unit from the plurality of managed units, wherein a second frequency of the backup BMU after the timed frequency hopping is consistent with a frequency of the first fault unit after the timed frequency hopping based on the first frequency hopping rule;
  communicating, by the backup BMU, with the first fault unit using the second frequency after the frequency hopping; and
  transmitting, by the backup BMU, the second frequency after the frequency hopping to the main BMU under a condition that the backup BMU communicates normally with the first fault unit using the second frequency after the frequency hopping, wherein the second frequency after the frequency hopping is used for communicating, by the main BMU, with the first fault unit.

11. The method of claim 7, wherein the method further comprises:
  reporting, by the backup BMU, fault information of the first fault unit under a condition that the backup BMU communicates abnormally with the first fault unit using the second frequency after the frequency hopping.

12. The method of claim 7, wherein the method further comprises:
  communicating, by the backup BMU, with each of the plurality of managed units, under a condition that the main BMU operates abnormally and the backup BMU operates normally;
  determining, by the backup BMU, from the plurality of managed units a second fault unit that communicates abnormally with the backup BMU;
  selecting, by the backup BMU, from the plurality of managed units a managed unit that communicates normally with both the backup BMU and the second fault unit as a second target unit;
  forwarding, by the backup BMU, second frequency conversion information to the second fault unit through the second target unit, wherein the second frequency conversion information is to instruct the second fault unit to convert its frequency to a third frequency; and
  communicating, by the backup BMU, with the second fault unit using the third frequency, and transmitting, by the backup BMU, the third frequency to all managed units of the plurality of managed units except the second fault unit.

13. The method of claim 7, wherein the method further comprises:
  forwarding, by the backup BMU, data between the backup BMU and the second fault unit through the second target unit, under a condition that the backup BMU communicates abnormally with the second fault unit using the third frequency.

14. The method of claim 7, wherein the method further comprises:
  performing a timed frequency hopping, by both the backup BMU and the second fault unit, based on a preset second frequency hopping rule under a condition that the backup BMU fails to select the second target unit from the plurality of managed units, wherein a fourth frequency of the backup BMU after the frequency hopping is consistent with a frequency of the second fault unit after the timed frequency hopping based on the second frequency hopping rule;
  communicating, by the backup BMU, with the second fault unit using the fourth frequency after the frequency hopping;
  transmitting, by the backup BMU, the fourth frequency after the frequency hopping to all managed units of the plurality of managed units except the second fault unit under a condition that the backup BMU communicates normally with the second fault unit using the fourth frequency after the frequency hopping; and
  reporting, by the backup BMU, fault information of the second fault unit under a condition that the backup BMU communicates abnormally with the second fault unit using the fourth frequency after the frequency hopping.

* * * * *